United States Patent
Carter et al.

(10) Patent No.: US 10,332,048 B2
(45) Date of Patent: Jun. 25, 2019

(54) JOB PROFILE GENERATION BASED ON INTRANET USAGE

(71) Applicant: INTERNATIONAL BUSINESS MACHINES CORPORATION, Armonk, NY (US)

(72) Inventors: Brian T. Carter, Navan (IE); Patrick J. Cronin, Cork (IE); Paul C. J. Dunning, Ratoath (IE); Shane Quigley, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/834,143

(22) Filed: Dec. 7, 2017

(65) Prior Publication Data

US 2018/0107964 A1    Apr. 19, 2018

Related U.S. Application Data

(63) Continuation of application No. 15/232,911, filed on Aug. 10, 2016.

(51) Int. Cl.
*G06Q 10/06* (2012.01)
*G06Q 10/10* (2012.01)

(52) U.S. Cl.
CPC .  *G06Q 10/063112* (2013.01); *G06Q 10/1053* (2013.01)

(58) Field of Classification Search
None
See application file for complete search history.

(56) References Cited

U.S. PATENT DOCUMENTS

| 7,146,574 | B2 | 12/2006 | Goldthwaite et al. |
| 7,188,074 | B2 | 3/2007 | Younger |
| 8,063,799 | B2 | 11/2011 | Samuels et al. |
| 8,200,584 | B2 | 6/2012 | Brickman, Jr. |
| 8,914,383 | B1 | 12/2014 | Weinstein et al. |
| 2007/0054248 | A1* | 3/2007 | Bare ............... G06Q 10/00 434/219 |
| 2012/0215795 | A1* | 8/2012 | Phelon ............ G06F 17/30867 707/749 |
| 2013/0198098 | A1* | 8/2013 | Schneiderman ..... G06Q 10/105 705/320 |

(Continued)

OTHER PUBLICATIONS

Business Insight Technologies, "Hire the Right Person for the Right Job", The Profile XT™ Product Information, Printed May 2, 2016, pp. 1-3.

(Continued)

*Primary Examiner* — Thomas L Mansfield
(74) *Attorney, Agent, or Firm* — Michael O'Keefe

(57) ABSTRACT

A method, computer program product, and system for job profile generation, the method, computer program product, and system include receiving employee intranet usage data, storing the received employee intranet usage data in a database, identifying a portion of the stored employee intranet usage data associated with the former employee, transmitting the portion to a recommender system, where the recommender system identifies one or more required job skills of the former employee, based on the transmitted portion, and generating a job profile based on the one or more identified required job skills.

20 Claims, 5 Drawing Sheets

(56) References Cited

U.S. PATENT DOCUMENTS

2014/0214711 A1* 7/2014 Filstein ............... G06Q 10/06
                                                        705/321
2014/0278821 A1    9/2014 McConnell
2014/0279629 A1    9/2014 McConnell
2015/0006422 A1    1/2015 Carter et al.
2015/0317753 A1   11/2015 Goel et al.
2017/0213272 A1*  7/2017 Mowatt ............ G06F 17/30867

OTHER PUBLICATIONS

Disclosed Anonymously, "System and Method for Finding Candidates for a Job Using Social Behavioral Analysis", Mar. 26, 2014, pp. 1-6, IPCOM000235823D.

Aboba et al., "The Network Access Identifier (RFC4282)", Dec. 1, 2005, pp. 1-18, IPCOM000132357D.

Mell et al., "The NIST Definition of Cloud Computing", National Institute of Standards and Technology, Special Publication 800-145, Recommendations of the National Institute of Standards and Technology, Sep. 2011, 7 pages.

Carter et al., "Job Profile Generation Based on Intranet Usage", U.S. Appl. No. 15/232,911, filed Aug. 10, 2016, pp. 1-34.

IBM: List of IBM Patents or Patent Applications Treated As Related (Appendix P), May 1, 2018, pp. 1-2.

* cited by examiner

JOB PROFILE GENERATION BASED ON INTRANET USAGE

BACKGROUND

The present invention relates generally to for the field of data processing, and more particularly to job profile generation.

A job profile, or job description, is a document that presents a summary of information related to a particular employment role, such as responsibilities, necessary skills, desired skills, and required education and credentials. A sufficiently descriptive job profile may be used by hiring personnel to successfully fill an open position by identifying and prioritizing desired candidate skills. Furthermore, application requirements included within a job profile may help job candidates determine their eligibility for an open position prior to submitting an application.

SUMMARY

Embodiments of the present invention disclose a method, computer program product, and system for job profile generation, the method, computer program product, and system include receiving employee intranet usage data, storing the employee intranet usage data in a database, identifying a portion of the employee intranet usage data which is associated with the former employee, transmitting the portion to a recommender system, where the recommender system identifies one or more required job skills of the former employee, based on the transmitted portion, and generating a job profile based on the one or more identified required job skills.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
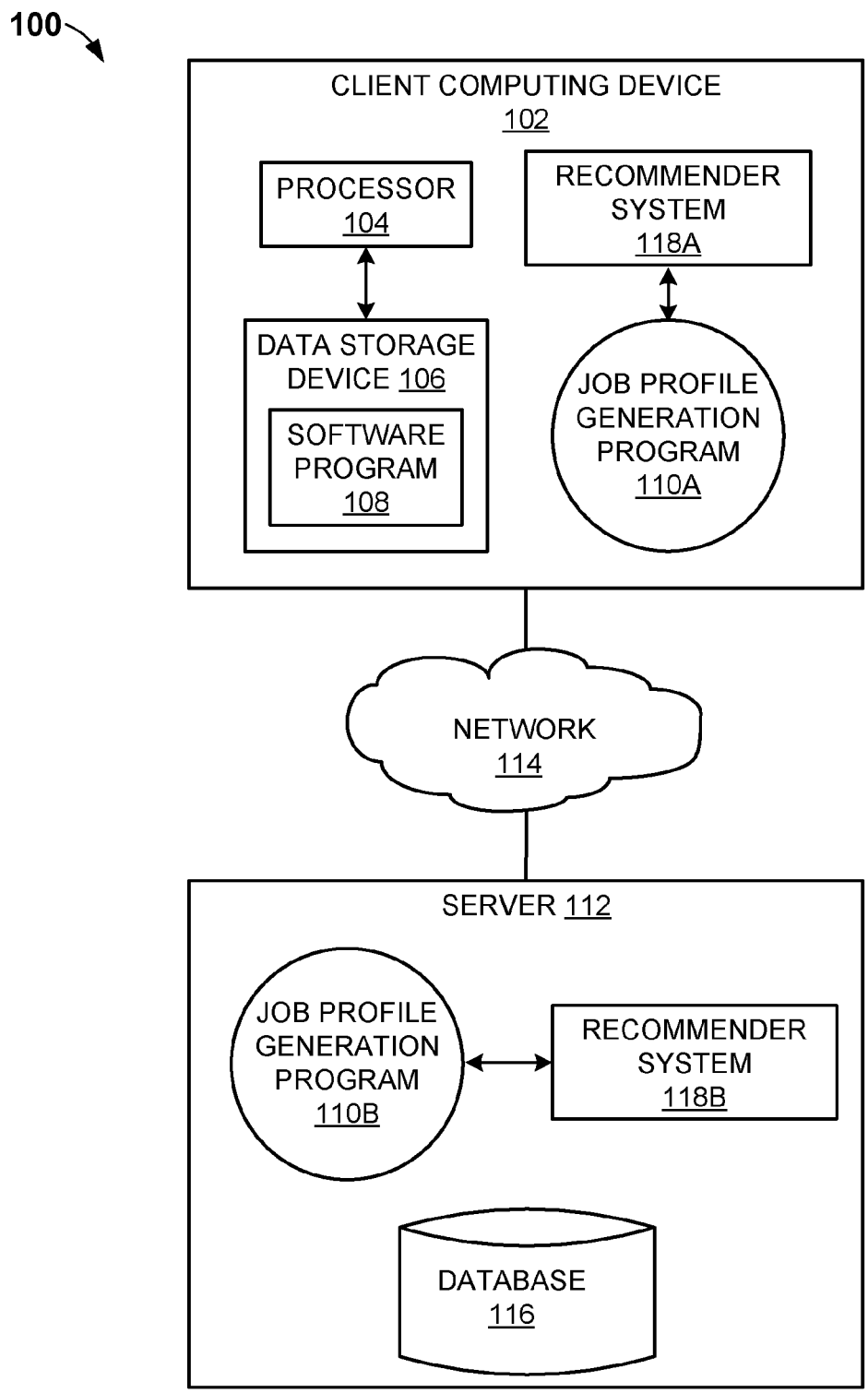
FIG. 1 depicts a functional block diagram of a networked computer environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention are related to the field of data processing, and more particularly to job profile generation. The following described exemplary embodiments provide a system, method, and program product to, among other things, create an employee job profile based on an employee's intranet usage. Therefore, the present embodiment has the capacity to improve the technical field of job profile generation by assisting users, for example, human resources employees, identify candidates with skills closely matching those of former and leaving employees, which may ensure a newly hired employee is a better fit within the team. Additionally, employer resources expended to fill a job opening may be reduced as less time may be spent generating a job profile manually and interviewing unqualified applicants.

As previously described, a job profile, or job description, is a document that presents a summary of information related to a particular employment role, such as responsibilities, necessary skills, desired skills, and required education and credentials. A sufficiently descriptive job profile may be used by hiring personnel to successfully fill an open position by identifying and prioritizing desired candidate skills. Furthermore, application requirements included within a job profile may help job candidates determine their eligibility for an open position prior to submitting an application.

Typically, job postings may include generic attributes. For example, a job posting may include a basic, company-specific job profile, a list of necessary job skills, a list of employer-desired skills, a required educational degree level, required candidate credentials, and fluency in certain languages.

Generic job postings may attract candidates without specific skills important to the job role. Additionally, generic job postings may not include hidden skills which the former or leaving employee frequently utilized to fulfil job requirements. For example, an original employee hired under a generic job posting, such as for a Java developer, may use and develop skills not included in the original posting, for example, design a Single Sign-On for a project. The newly used and developed skills should ideally be added to either the necessary skills or the desired skills in the job profile in order to identify desired candidate skills, and increase the chance that a backfill or candidate for an open position is as effective as the previous employee.

Furthermore, generic job postings may not identify specific skills used by a team in order to make their product or service effective. For example, a human resources department may lack requisite knowledge of the specific job requirements necessary for a qualified candidate and may spend time and resources to generate an accurate job description. Job postings that lack specific skill requirements may unnecessarily waste employer resources by interviewing job candidates who do not possess necessary skills for an open position. Additionally, candidate resources may be wasted due to the candidate lacking a clear understanding of the job requirements or possessing unrealistic expectations of the work environment. As such, it may be advantageous to, among other things, implement a system to identify and prioritize desired candidate skills by analyzing a former or leaving employee's intranet usage.

The present invention generally relates to data processing and more specifically to job profile generation. One way to generate a job profile may be to utilize evolutionary algorithms. An embodiment by which to use evolutionary algorithms to generate a job profile is described in detail below by referring to the accompanying drawings in FIGS. 1 to 5. Those skilled in the art will readily appreciate that the detailed description given herein with respect to these figures is for explanatory purposes as the invention extends beyond these limited embodiments.

In order to generate an effective job profile for a leaving employee, an intranet history of the leaving employee can be analyzed and used to create a job profile. The job profile may useful in identifying job candidates to fill the job opening left by the leaving employee. Furthermore, the skills and effectiveness of the previous employee can be identified by using evolutionary algorithms to generate the job profile based on the leaving employee's intranet history. An employer may create an intranet of a local or restricted communications network for employee use.

Evolutionary algorithms can be used to generate the job profile. In artificial intelligence, an evolutionary algorithm is a subset of evolutionary computation. Evolutionary computation is a generic population-based metaheuristic optimization algorithm. Evolutionary algorithms are designed to take a generic population and use a mechanism inspired by nature, e.g. mutation, reproduction, recombination, or selection, to create new generations of the population which steadily improve problem solving or fulfilling a particular criteria based off a fitness function. A type of evolutionary algorithm used in this method is grammatical evolution. Grammatical evolution is an evolutional search algorithm typically used to generate a program fragment that may achieve a good fitness value for a given objective function.

An accurate job profile may assist in identifying qualified job candidates with skills closely matching those of the leaving employee. Qualified job candidates may prove to be better replacements for a leaving employee within a team. An accurate job profile may also help reduce the amount of time spent by a hiring employee responsible for interviewing applicants by eliminating those applicants without the required skills for the job opening. Additionally, current employees may not need to spend as much time on-boarding and training new hires with necessary and desired skills.

Furthermore, more specific job qualifications may be included within a job profile to assist applicants determine their eligibility for an open position prior to submitting an application.

Furthermore, as previously described, a company using accurate job postings generated using evolutionary algorithms may utilize fewer resources hiring new employees possessing necessary job skills since the hiring employee may spend less time identifying qualified candidates. Additionally, the evolutionary algorithms could be used to create accurate job profiles of all current employees. Such profiles may be useful in a variety of circumstances, such as when a team is expanding and planning to hire an additional employee or when an employee is out-of-office and coverage is needed for the employee's duties.

Furthermore, third party tools capable of tagging or identifying keywords in an intranet search history, and which lend to the use of keywords that can be used in the generation of a job posting, may be used to create an accurate job profile. Third party tools capable of tagging abilities may include a collaborative change management tool, such as IBM® Rational Team Concert™ (IBM Rational Team Concert and all IBM Rational Team Concert-based trademarks and logos are trademarks or registered trademarks of International Business Machines Corporation and/or its affiliates), a business social network, such as IBM® Connections™ (IBM Rational Team Concert and all IBM Rational Team Concert-based trademarks and logos are trademarks or registered trademarks of International Business Machines Corporation and/or its affiliates), and internet search systems. Such third party tools or systems may assist in ingesting tracking data about employees to be used in job postings.

Referring now to FIG. 1, a functional block diagram illustrating a system 100 in a networked computer environment, in accordance with an embodiment of the present invention, is shown. The system 100 may include a client computing device 102 and a server 112. The client computing device 102 may communicate with the server 112 via a network 114. The client computing device 102 may include a processor 104, a data storage device 106, a job profile generation program 110A, and a recommender system 118A. The client computing device 102 may be enabled to run the job profile generation program 110A. The job profile generation program 110A may communicate with and utilize the recommender system 118A. The client computing device 102 may be enabled to interface with a user and communicate with the server 112.

The server 112 may also include a processor, a database 116, a job profile generation program 110B and a recommender system 118B. The server 112 may be enabled to run the job profile generation program 110B. The job profile generation program 110B may communicate with and utilize the recommender system 118B.

In an embodiment, the client computing device 102 may operate as an input device that includes a user interface while the job profile generation program 110B may run primarily on the server 112. In an alternative embodiment, the job profile generation program 110A may run primarily on the client computing device 102 while the server 112 may be used for processing a storage of data used by the job profile generation program 110A. The job profile generation program 110A may be substantially the same as the job profile generation program 110B.

In an embodiment, the recommender system 118B may run primarily on the server 112. In an alternative embodiment, the recommender system 118A may run primarily on the client computing device 102 while the server 112 may be used for processing a storage of data used by the recommender system 118A. The recommender system 118A may be substantially the same as the recommender system 118B. The recommender system 118A may run primarily on the client computing device 102 while the job profile generation program 110A, 110B may run primarily on either the client computing device 102 or the server 112. Alternatively, the recommender system 118B may run primarily on the server 112 while the job profile generation program 110A, 110B may run primarily on either the client computing device 102 or the server 112.

Processing for the job profile generation program 110A, 110B may, in some instances, be shared amongst the client computing device 102 and the server 112 in any ratio. In another embodiment, the job profile generation program 110A, 110B may operate on more than one server 112, client computing device 102, or some combination of servers 112 and client computing devices 102, for example, a plurality of client computing devices 102 communicating across the network 114 with a single server 112.

The network 114 may include wired connections, wireless connections, fiber optic connections, or some combination thereof. In general, the network 114 can be any combination of connections and protocols that will support communications between the client computing device 102 and the server 112. The network 114 may include various types of networks, such as, for example, a local area network (LAN), a wide area network (WAN) such as the Internet, a telecommunication network, a wireless network, a public switched network and/or a satellite network.

In various embodiments, the client computing device 102 and the server 112 may be, for example, a laptop computer, tablet computer, netbook computer, personal computer (PC), a desktop computer, a personal digital assistant (PDA), a smart phone, a mobile device, or any programmable electronic device capable of communicating with the server 112 and the client computing device 102, respectively, via the network 114. Additionally, the server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. As described below with reference to FIG. 3, the client computing device 102 and the server 112 may each include internal and external components. In other embodiments, the server 112 may be implemented in a cloud computing environment, for example, cloud computing nodes 510, as described in relation to FIGS. 4 and 5 below. Similarly, the client computing device 102 may be implemented in the cloud computing environment, for example, laptop computer 540C as shown in FIG. 4.

In an embodiment, the system 100 may include any number of client computing devices 102 and/or servers 112; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The system 100 may be generally configured to perform actions to generate a job profile. The job profile generation program 110A, 110B and associated methods, and the recommender system 118A, 118B, are described and explained in further detail below with reference to FIGS. 2-5.

Figure 2:
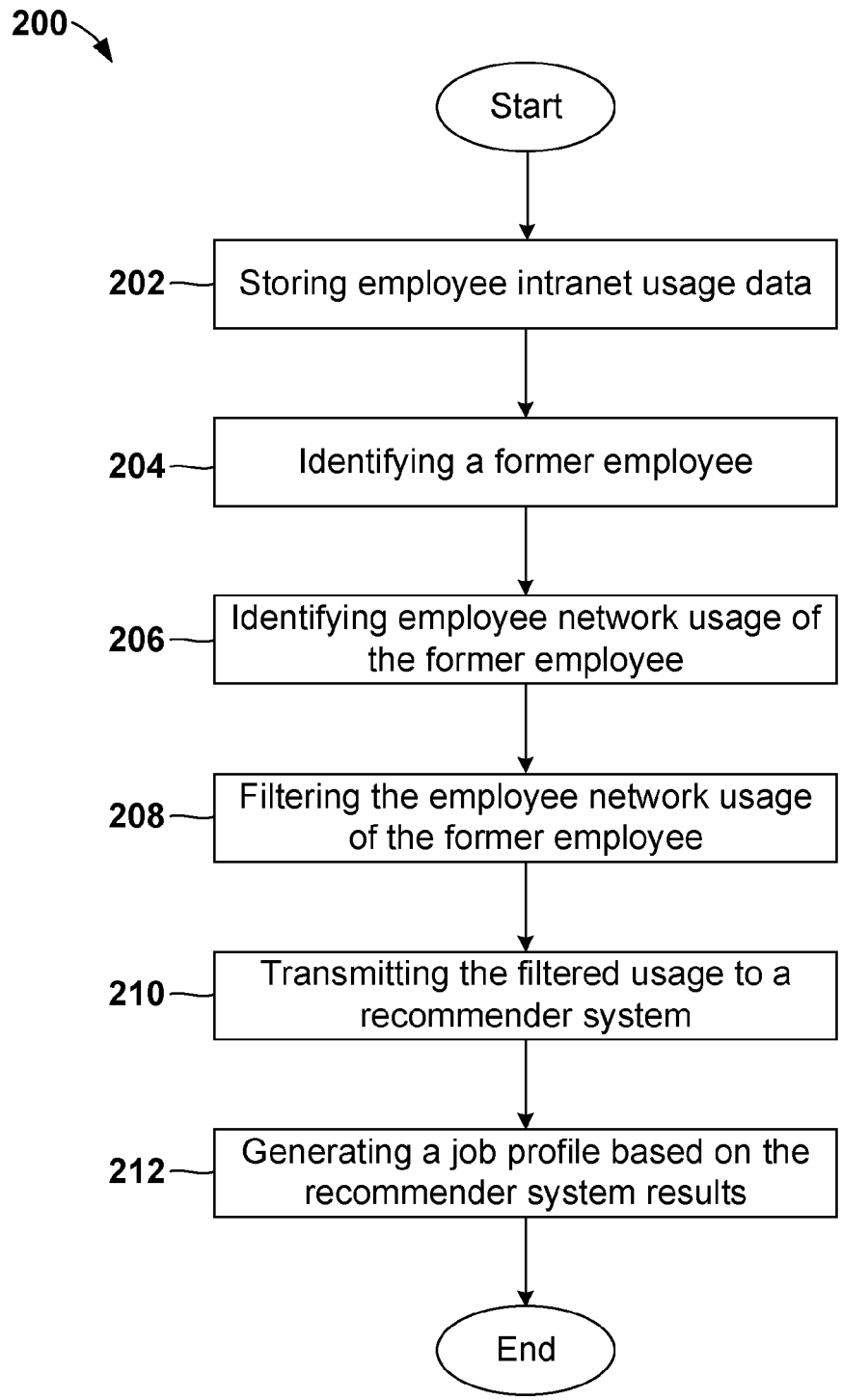
FIG. 2 depicts a flowchart of operational steps of a job profile generation program within the data processing environment of FIG. 1, in accordance with an embodiment of the present invention.

Referring now to FIG. 2, an operational flowchart of a job profile generation process 200 is depicted, according to an embodiment. A method for job profile generation may include receiving employee intranet usage data by the job profile generation program 110A, 110B and storing employee intranet usage data, in step 202. The employee intranet usage data may include, for instance, version control systems and internal social networks. The intranet usage data may also include information collected from tracking each employee's interactions with the intranet, such as websites visited and the associated link for each website, commands executed, text entered, searches executed, and other interactions with the intranet. The granularity of the stored employee intranet usage data may be configured by a user. For example, a high level of granularity of storing the employee intranet usage data may include storing an employee's browsing history, click path on an intranet page and words typed in a fillable entry box. Alternatively, a low level of granularity may include a click path on an intranet page, but not a browsing history or words typed in a fillable entry box.

The user may determine that specific websites or employee actions be included in the stored employee intranet usage data, while other websites or employee actions may not be included. For example, known programs and/or applications may be included, such as an application website, while a human resources department intranet website may not be included in the stored employee intranet usage data. The employee intranet usage data may be stored, for example, in the data storage device 106, or the database 116, both as shown in FIG. 1. Alternatively, the employee intranet usage data may be stored in an external database.

Identifying an employee who has left the company may be performed in step 204. The position of the former employee may require the hiring of a replacement employee, and a job profile may need to be created to assist in the identification of required qualifications of potential candidates to fill the open position. Alternatively, an employee who is planning to leave the company may be identified, or an additional employee may be needed who possesses skills similar to an existing employee. The open position may be identified by a company human resources department, a hiring manager, or by other means.

Identifying the intranet usage data of the former employee from the stored employee intranet usage data may be performed at step 206. The former employee intranet usage data may be copied into, for example, the data storage device 106, or the database 116, if the intranet usage data was stored in an external database. The former employee intranet usage data may be formatted in a table as follows:

| Date Performed | Event Description | Associated Link | Associated Tags | Keywords |
|---|---|---|---|---|
| Dec. 4, 2008 | commit of PBKDDFF2 implementation | http:// projectAmanager/ workitem23 | Ethical hacking, high, ODF | PBKDDFF2, ODF, projectA |

In the formatted example above, a first column, date performed, shows a date of an event in the former employee intranet usage data. A second column, event description, is a description of an action of the former employee. In this example, the former employee executed a program. A third column, associated link, identifies a web address at which the former employee performed the event. A fourth column, associated tags, shows any system tags which may be associated with the associated link, or the event description. The associated tags may help to categorize the associated link or event description, however, a particular event may not have any associated tags. Additionally, the associated tags may be generated by the job profile generation program 110A, 110B by using machine learning. In an alternate embodiment, a user may create the associated tags and manually enter each associated tag into the job profile generation program 110A, 110B. Furthermore, machine learning may be utilized to update the associated tags by the job profile generation program 110A, 110B over time. The fifth column, keywords, may include keywords associated with the event description, the associated link, or the associated tags that may help categorize the event. The keywords may be generated by the job profile generation program 110A, 110B, and may be created by a user or obtained by another method, such as data mining.

The formatting of the table may be performed by the job profile generation program 110A, 110B, or by an external program. Words associated with each event description may be transformed into a set of associated tags and an associated link. The transformation may be performed by aggregating all adjectives and nouns together. Duplicate event descriptions may be removed and an occurrence number identified for each event. The occurrence number for each event may be a number of times the same event description has occurred. The resulting events may each be stored as a metadata variable, which may be stored in database 116.

Filtering of the former employee intranet usage data may be performed at step 208. Filtering of the former employee intranet usage data may include removing website information, which is common to all employees. For example, a companywide training utilized by all employees, such as a business conduct guidelines review, may be common to all employees and filtered out. The scale of the filtering may be dependent on a company size. For example, a large company with diverse job types may require more filtering of the intranet usage of the former employee. Alternatively, a small company which has many employees with a similar job role may require less filtering.

Transmitting the filtered intranet usage data of the former employee through a recommender system 118A, 118B, as shown in FIG. 1, may be performed at step 210. The recommender system 118A, 118B may produce a list of skills related to job responsibilities of the former employee.

The recommender system 118A, 118B, or recommendation system, is a subclass of an information filtering system that may predict a weight, a rating, to an item which may be assigned by a user. The item may be an item from a group of items, or the item may be a list from a group of lists. In an example, the item may be a list or a set of keywords, phrases, or associated tags. The recommender system 118A, 118B may also be a natural computing system which can be trained by using sample sets or lists of historical events. The training or learning may be performed by running the recommender system 118A, 118B repetitively using intranet usage data of sample employees, and comparing the recommender system 118A, 118B results with a corresponding an employee-provided skill set.

In an embodiment, the recommender system 118A, 118B may be trained using several sample lists. The several sample lists may include terms which are randomly generated from associated tags and keywords from events from the employee intranet usage data for a current employee. Each of the terms may be associated with a skill. The association of a term with a skill may be performed by the job profile generation program 110A, 110B, by the recommender system 118A, 118B, or by a user. The recommender system 118A, 118B may identify a best list of the several sample lists. The best list may contain terms which may be related to skills which most closely align with a list of skills provided by the current employee. Training may be repeated with additional current employees, in order to improve the accuracy of the recommender system 118A, 118B. This training may help improve the identification of a list of skills related to job responsibilities of a selected employee.

During operation, the recommender system 118A, 118B may randomly generate several sample lists that each contain terms or groups of words. The terms may come from the associated tags and the keywords from the filtered intranet usage data of the former employee. Occurrence information as well as a date performed of each event may help to give a weight or assign a relative importance to each term of the set of terms. For example, associated tags and keywords of a recently occurring event may have greater weight than associated tags and keywords of an older event, while associated tags and keywords of a particular event description with a higher occurrence number may have a greater weight than associated tags and keywords of another event description.

The recommender system 118A, 118B may compare random subsets of lists of the several sample lists, and assign a rating to each list of the subsets of lists. The rating may be based on comparison of the terms in each list of the subsets of where a higher rating may indicate a higher probability that a list of the multiple lists is more likely to contain terms more closely related to an employee-provided list of skills.

The recommender system 118A, 118B may perform the comparison for several generations, for example, 40 generations, of comparing random subsets of lists. The random subsets of lists may be ranked based on a probability that each list aligns with the required skills and the preferred skills performed by the former employee.

In an embodiment, multiple randomly generated lists of roughly equal size to an average size of a skill list may be created by the recommender system 118A, 118B. For example, 1,000 randomly generated lists may each include 10 associated tags and keywords. The recommender system 118A, 118B may identify a weight or rank to each of the several sample lists. The recommender system 118A, 118B may identify a best list of the several sample lists to be the most likely to contain terms most closely related to the job skills of the former employee. The recommender system 118A, 118B may be able to identify a best list of necessary skills and a best list of desired skills most closely related to the job skills of the former employee.

The ranking or comparison of each list may take into account a fitness function associated with each list. The fitness function may compare terms of each list to terms associated with an employee-generated skill list and a higher fitness function may indicate a closer match of terms. The ranking or comparison of each list also take into account a Backus-Naur Form Grammar. The Backus-Naur Form Grammar is a set of rules which define a language, which is used to define the words used in each list. Crossover is when two lists are combined to generate an offspring list. The point of the grammar is that crossover can occur at any of the point with a bar symbol, "|", as shown in the equation below. If a grammar is not used, crossover could potentially occur in the middle of associated words, or between an adjective and its noun if they were grouped together as a skill.

In an example, the Backus-Naur Form Grammar and Fitness Function may be used as a basis for an evolutionary algorithm, as shown below:

Backus-Naur Form Grammar:

<skill_list> ::= <skill> <separator> <skill_list> | <skill>
<skill> ::= <adjective> | <noun> | <adjective> <noun>

Fitness Function:

Result = (skill match effectiveness * every matched skill − unmatched word effectiveness * every unmatched word) * (average date of skill list − day of leaving/days in the company) * (occurrence effectiveness * average occurrence)

In this example, occurrence effectiveness, the skill match effectiveness, and the unmatched word effectiveness may each be a real value between 0 and 1, where each variable has an initial value of 1. Additionally, the occurrence effectiveness, the skill match effectiveness, and the unmatched word effectiveness may be adjusted over time by the job profile generation program 110A, 110B, the recommender system 118A, 118B, or by a user. In an embodiment, the skill match effectiveness and the unmatched word effectiveness may be different numbers to prevent multiplication by zero, which would remove the relevance of the remaining data. Once optimal, or close to optimal, variables have been found and verified as correct to a reasonable percentage against a separate training set, the algorithm may be used as a system to generate a list of skills based on a list of events, described above, representing an employee's intranet history.

Once created by the recommender system 118A, 118B, the best list of skills of the former employee may be transmitted to the job profile generation program 110A, 110B.

Generating a job profile may then be performed by the job profile generation program 110A, 110B, at step 212. The best list of skills can be edited and merged into a generic recruitment template to provide the job profile for the open position of the former employee. The job profile may be a specific list of the required skills and preferred skills to assist the user when recruiting candidates for the open position.

Once created by the job profile generation program 110A, 110B, the job profile may be posted on a recruitment web site, either internal or external, to assist in finding potential candidates to fill the job opening for the open position.

In an alternate embodiment a team may be expanding and require an additional employee or a new hire, or alternatively, a temporary employee is needed due to a leave of absence. Therefore, the job profile generation program 110A, 110B may use the employee intranet usage data of one or more employees in a similar position to the new hire, or of the employee on a temporary leave of absence to identify a list of required skills and generate a job profile.

Figure 3:
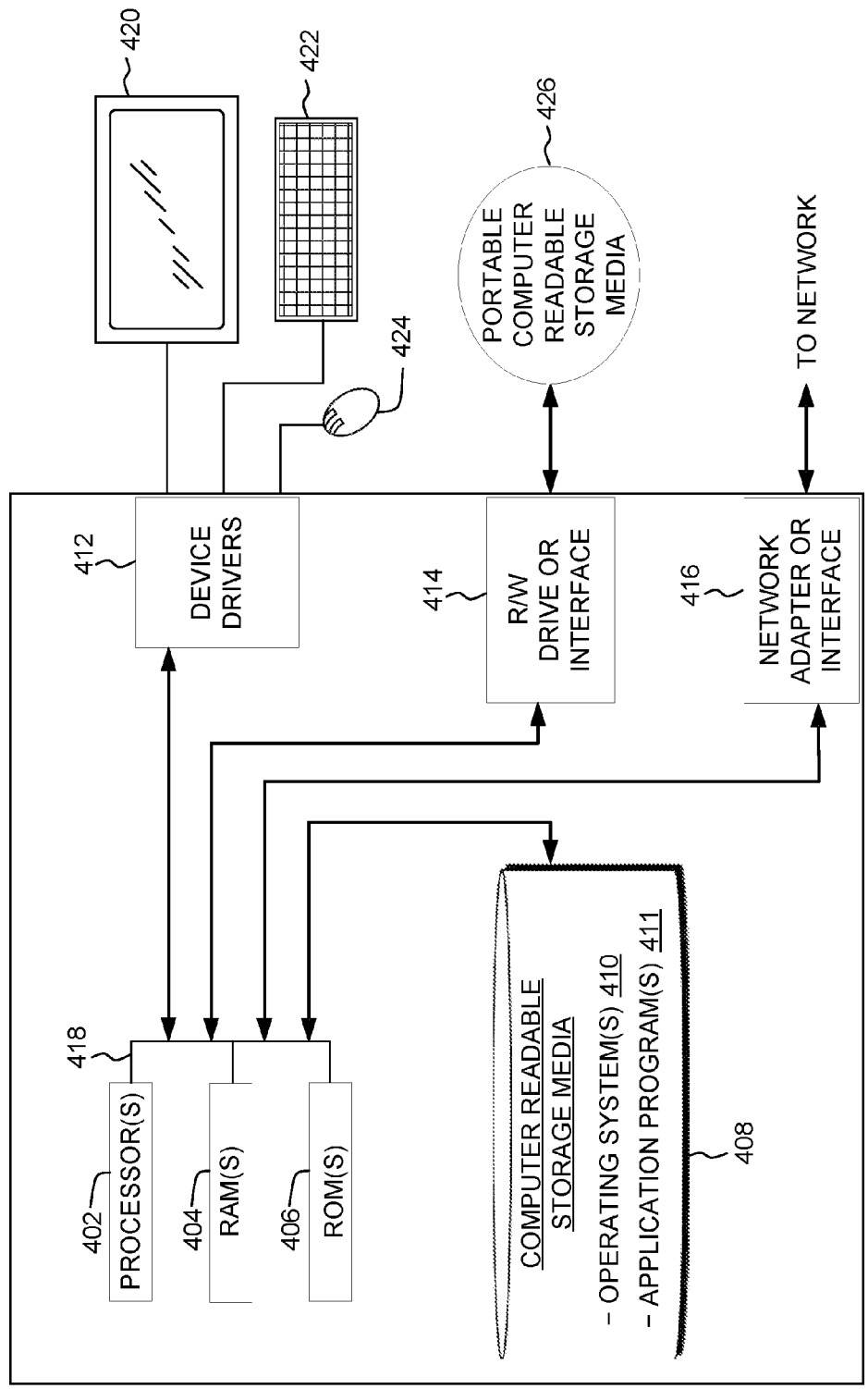
FIG. 3 depicts a block diagram of internal and external components of computers and servers of FIG. 1, in accordance with an embodiment of the present invention.
Figure 4:
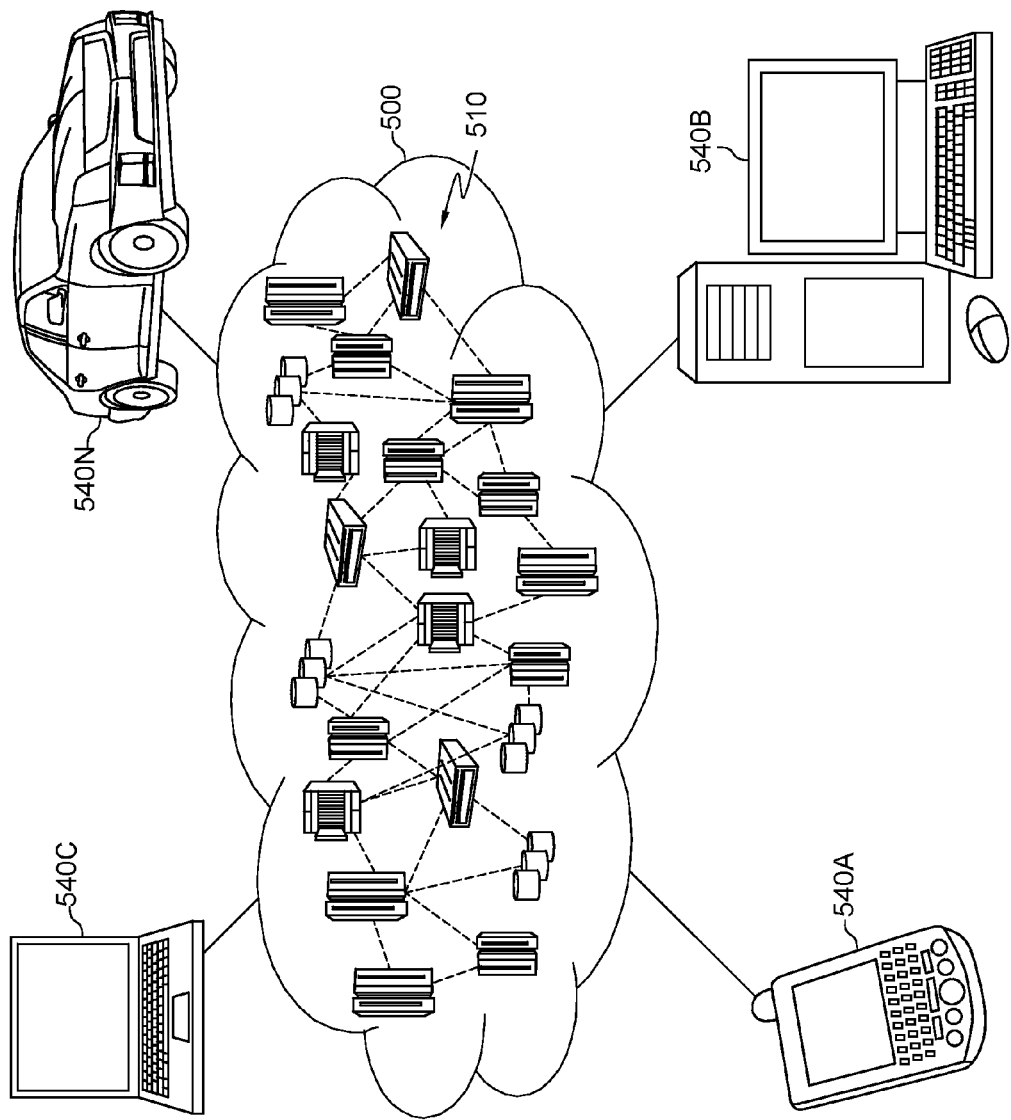
FIG. 4 depicts a cloud computing environment, in accordance with an embodiment of the present disclosure.

Referring now to FIG. 3, a block diagram of components of a computing device, such as the client computing device 102 or the server 112, of the system 100 of FIG. 1, in accordance with an embodiment of the present invention is shown. It should be appreciated that FIG. 3 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the job profile generation program 110A, 110B, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 510 and cloud computing environment 500 can communicate with any type of computerized device over any type of network and/or network addressable connection (e.g., using a web browser).

Figure 5:
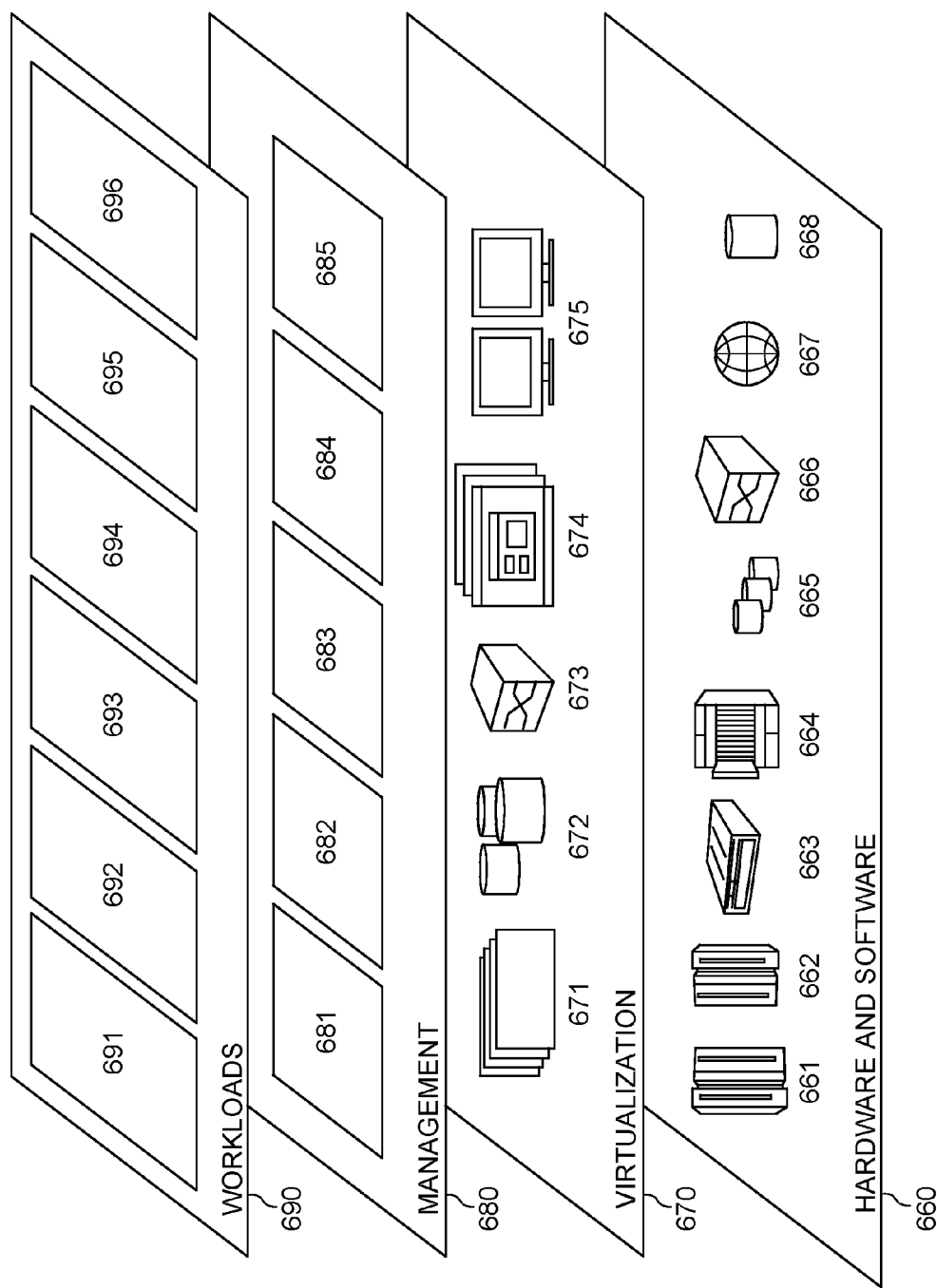
FIG. 5 depicts abstraction model layers, in accordance with an embodiment of the present invention.

Referring now to FIG. 5, a set of functional abstraction layers provided by cloud computing environment 500 (for example, the network 114 of FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 106 and the database 116 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and employee job profile generation 696. Employee job profile generation 696 may relate to using employee intranet usage data to generate a job profile, for example, the job profile generation program 110A, 110B.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for job profile generation on a computer, the computer program product comprising:
   one or more computer-readable storage media and program instructions stored on the one or more computer-readable storage media, the program instructions comprising:
   program instructions to receive employee intranet usage data related to each employee of a company, wherein the intranet usage data is at least one member selected from a group consisting of websites visited, an associated link for each website, commands executed, text entered, searches executed, version control systems, and internal social networks;
   program instructions to store the received employee intranet usage data in a database;
   program instructions to identify a portion of the stored employee intranet usage data related to each employee of the company which is associated with a first employee;
   program instructions to transmit the portion to a recommender system, wherein the recommender system identifies one or more required job skills of the first employee, based on the transmitted portion,
   wherein training of the recommender system comprises training with sample lists of associated tags and keywords from the employee intranet usage data, generating a group of sample lists and identifying a best list of the group of sample lists based on a fitness function associated with each sample list of the group of sample lists; and
   program instructions to generate a job profile based on the one or more identified required job skills of the first employee.

2. The computer program product according to claim 1, wherein the stored employee intranet usage data is at least one member selected from a group consisting of a date performed, an event description, and an intranet link associated with an event.

3. The computer program product according to claim 2, further comprising:
   program instructions to assign a tag to the event description from the event of the stored employee intranet usage data.

4. The computer program product according to claim 1, wherein the program instructions to identify the portion of the stored employee intranet usage further comprises:
   program instructions to remove extraneous information common to a plurality of employees.

5. The computer program product according to claim 3, wherein the program instructions to assign the tag to the event description from the event of the employee intranet usage further comprises:
   program instructions to rank a random list of one or more associated tags; and
   program instructions to identify a best list from the random list, wherein the best list has a highest probability of matching a required job skill of the former employee.

6. The computer program product according to claim 1, wherein the program instructions to generate the job profile further comprises:
   program instructions to format the one or more identified required job skills into a recruitment template.

7. The computer program product according to claim 1, further comprising:
   program instructions to post the generated job profile on a recruitment web site.

8. A computer system for job profile generation on a computer, the computer system comprising:
   one or more computer processors, one or more computer-readable storage media, and program instructions stored on the one or more computer-readable storage media for execution by at least one of the one or more computer processors, the program instructions comprising:
   program instructions to receive employee intranet usage data related to each employee of a company, wherein the intranet usage data is at least one member selected from a group consisting of websites visited, an associated link for each website, commands executed, text entered, searches executed, version control systems, and internal social networks;
   program instructions to store the received employee intranet usage data in a database;
   program instructions to identify a portion of the stored employee intranet usage data related to each employee of the company which is associated with a first employee;

program instructions to transmit the portion to a recommender system, wherein the recommender system identifies one or more required job skills of the first employee, based on the transmitted portion, wherein training of the recommender system comprises training with sample lists of associated tags and keywords from the employee intranet usage data, generating a group of sample lists and identifying a best list of the group of sample lists based on a fitness function associated with each sample list of the group of sample lists; and program instructions to generate a job profile based on the one or more identified required job skills of the first employee.

9. The computer system according to claim 8, wherein the stored employee intranet usage data is at least one member selected from a group consisting of a date performed, an event description, and an intranet link associated with an event.

10. The computer system according to claim 9, further comprising:

program instructions to assign a tag to the event description from the event of the stored employee intranet usage data.

11. The computer system according to claim 8, wherein the program instructions to identify the portion of the stored employee intranet usage further comprises:

program instructions to remove extraneous information common to a plurality of employees.

12. The computer system according to claim 10, wherein the program instructions to assign the tag to the event description from the event of the employee intranet usage further comprises:

program instructions to rank a random list of one or more associated tags; and program instructions to identify a best list from the random list, wherein the best list has a highest probability of matching a required job skill of the former employee.

13. The computer system according to claim 8, wherein the program instructions to generate the job profile further comprises:

program instructions to format the one or more identified required job skills into a recruitment template.

14. The computer system according to claim 8, further comprising:

program instructions to post the generated job profile on a recruitment web site.

15. A computer system for job profile generation on a computer, the computer system comprising:

one or more computer processors, one or more computer-readable storage media, and program instructions stored on the one or more computer-readable storage media for execution by at least one of the one or more computer processors, the program instructions comprising:

program instructions to receive employee intranet usage data related to each employee of a company, wherein the intranet usage data is at least one member selected from a group consisting of websites visited, an associated link for each website, commands executed, text entered, searches executed, version control systems, and internal social networks;

program instructions to store the received employee intranet usage data in a database;

program instructions to identify a portion of the stored employee intranet usage data related to each employee of the company which is associated with a first employee;

program instructions to utilize machine learning to provide associated tags for each event description and each intranet link in the portion of the stored employee intranet usage data;

program instructions to provide associated keywords for each event description, each intranet link and each associated tag in the portion of the stored employee intranet usage data;

program instructions to transmit the portion of the stored employee intranet usage data, the associated tags and the associated keywords, to a recommender system, wherein the recommender system identifies one or more required job skills of the first employee, based on the transmitted portion, wherein training of the recommender system comprises training with sample lists of associated tags and keywords from the employee intranet usage data, generating a group of sample lists and identifying a best list of the group of sample lists based on a fitness function associated with each sample list of the group of sample lists; and program instructions to generate a job profile based on the one or more identified required job skills of the first employee.

16. The computer system according to claim 15, wherein the stored employee intranet usage data is at least one member selected from a group consisting of a date performed, an event description, and an intranet link associated with an event.

17. The computer system according to claim 16, further comprising:

program instructions to assign a tag to the event description from the event of the stored employee intranet usage data.

18. The computer system according to claim 15, wherein the program instructions to identify the portion of the stored employee intranet usage further comprises:

program instructions to remove extraneous information common to a plurality of employees.

19. The computer system according to claim 17, wherein the program instructions to assign the tag to the event description from the event of the employee intranet usage further comprises:

program instructions to rank a random list of one or more associated tags; and program instructions to identify a best list from the random list, wherein the best list has a highest probability of matching a required job skill of the former employee.

20. The computer system according to claim 15, wherein the program instructions to generate the job profile further comprises:

program instructions to format the one or more identified required job skills into a recruitment template.

* * * * *